JOHN D. HELMS
INVENTOR

BY *James C. Faile*

ATTORNEY

June 30, 1970            J. D. HELMS            3,517,624
MOVABLE TABLE SURFACE AND MEANS OF POSITIONING SAME
Filed April 29, 1968
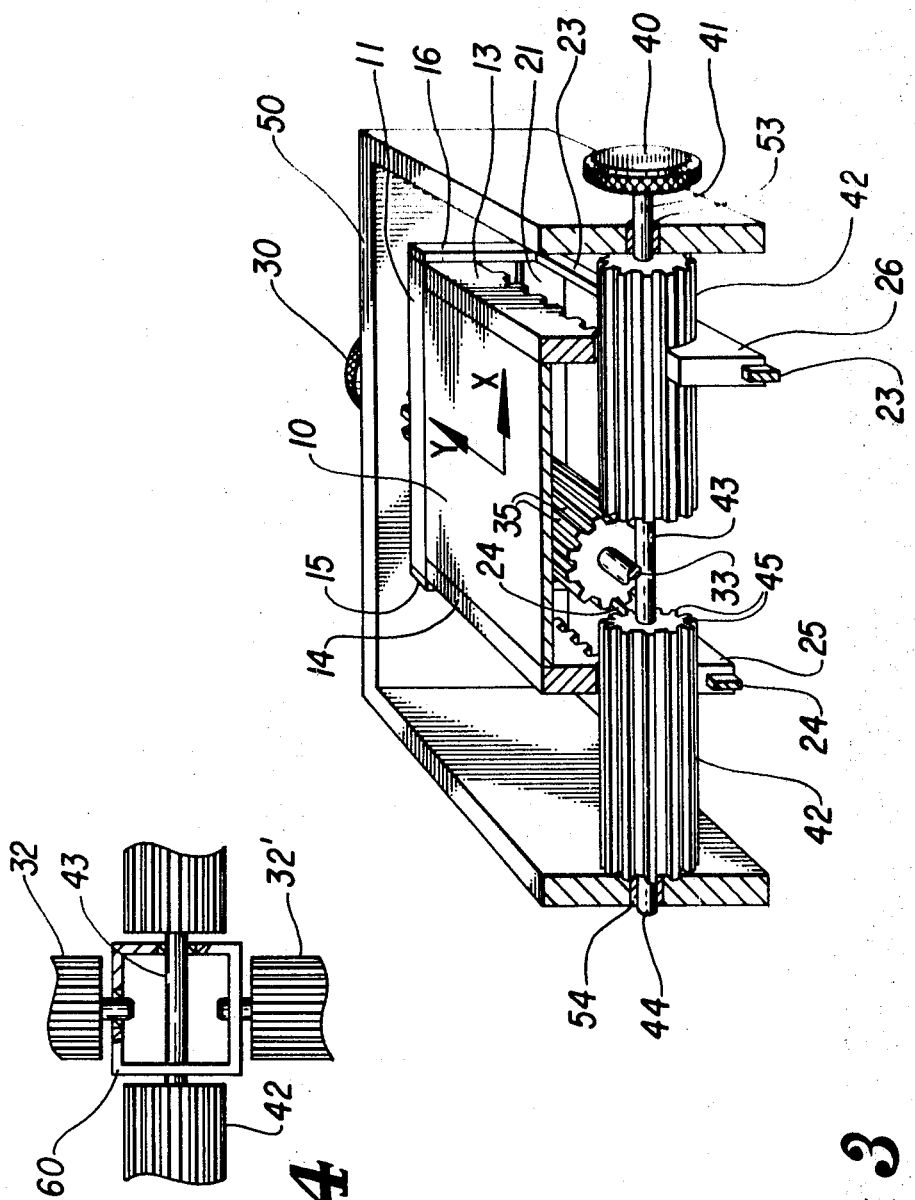

United States Patent Office 3,517,624
Patented June 30, 1970

3,517,624
MOVABLE TABLE SURFACE AND MEANS OF POSITIONING SAME
John D. Helms, Farmers Branch, Tex., assignor to Texas Instruments Incorporated, Dallas, Tex., a corporation of Delaware
Filed Apr. 29, 1968, Ser. No. 725,086
Int. Cl. A47b 1/10
U.S. Cl. 108—137
9 Claims

ABSTRACT OF THE DISCLOSURE

Disclosed is a movable table surface having two mutually perpendicularly disposed pinions respectively extending substantially beyond the length and width of the table, each pinion engaging a pair of four racks mounted on the table so that the rotation of one pinion moves the table along the direction of the other pinion.

---

The invention relates to apparatus for positioning a table surface or the like.

In many manufacturing processes a table surface capable of being accurately positioned anywhere on its plane surface is desirable, especially if a series of operations is to be performed upon a small article by a bulky or immovable machine. For example, mounting a printed circuit board upon a movable table under a drill press may be convenient for drilling a series of holes in the board, the table being positioned, for example, by an operator following a template or, in more sophisticated processes, by a computer. Such movable tables are often referred to as $x$–$y$ tables, the $x$ and $y$ axes being implied for a position reference.

In commonly used $x$–$y$ tables, at least one of the motors for positioning the table is mounted and carried by the table itself, thereby increasing the inertial mass of the table and making rapid, accurate positioning difficult. Furthermore, the physical size of the motors often adds to the size of the overall apparatus making use on an assembly line workbench awkward and impracticable.

It is therefore an object of the present invention to provide a movable table, the work surface of which can be accurately and rapidly moved to a desired position.

It is a further object to provide a movable table of small and compact size with a small inertial mass.

Other objects, features and advantages of the invention will be readily apparent to those skilled in the art from the following detailed description when read in conjunction with the appended claims and the accompanying drawings wherein:

FIG. 3 is a perspective view of a cross section of the table assembly of the present invention; taken at 3—3 of FIG. 1; and FIG. 4 is a plan view, partially cut away, of a portion of an alternative apparatus for achieving a pinion crossover.

In accordance with the present invention, a movable table is provided comprising a movable table surface of general parallelogram shape having gear racks appended adjacent to and extending downward from each of its sides so that the teeth of each of the two mutually perpendicular pinions simultaneously mesh with the two gear racks that are disposed orthogonally to the axes of the respective pinions. When one pinion is rotated, the table moves transversely to the axis of that pinion, the teeth of the other pinion acting as grooveguides therefor.

Figure 1:
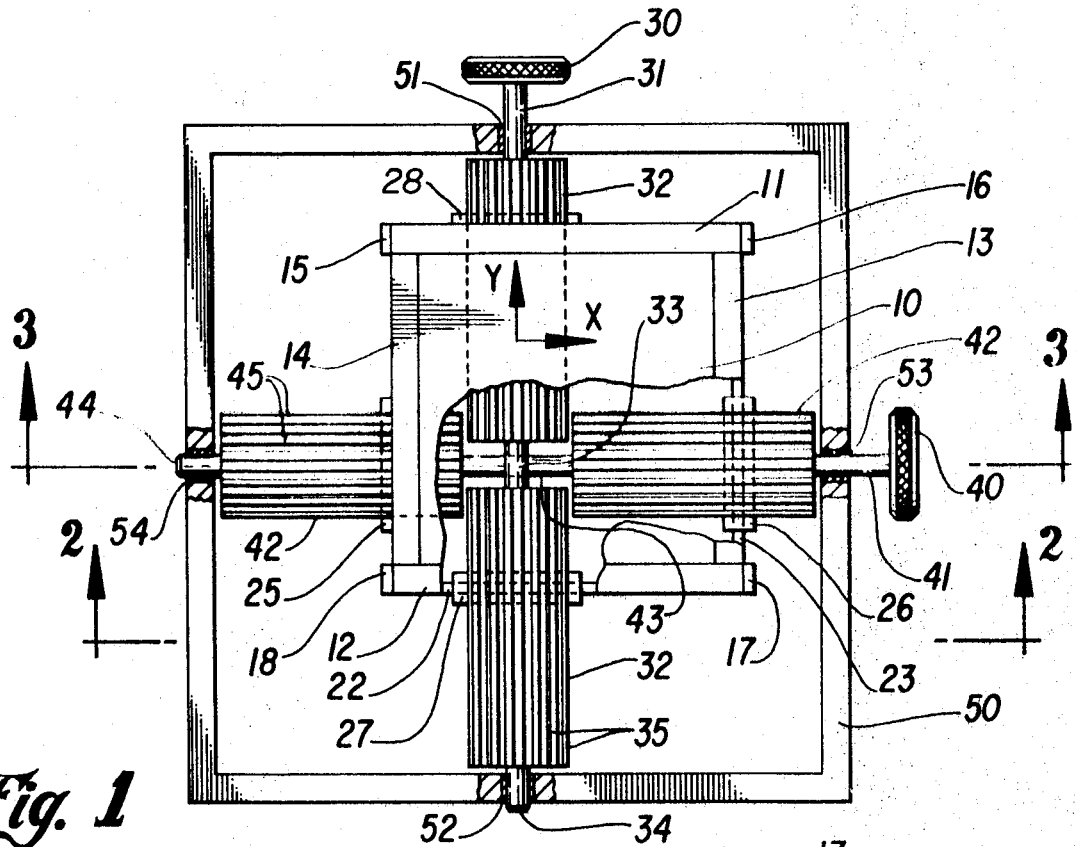
FIG. 1 is a plan view of the present invention with a portion of the table surface cut away to show the relationship of the pinions.

Referring now to the figures, and specifically to FIG. 1 for a description of a preferred embodiment, the invention employs four main assemblies: the general support body, denoted by numerals in the 50's; the $x$-axis pinion, denoted by numerals in the 40's; the $y$-axis pinion, denoted by numerals in the 30's; and the table assembly, denoted by numerals in the 10's and 20's. Support for the table assembly is provided by general support body 50 of parallelogram shape and appropriate in size to accommodate the movable table surface. The support body 50 may be made, for example, of cast iron, aluminum, or other suitable material. Bushings 51, 52, 53, and 54 are provided in the sides of support body 50 in order to afford support pinions 32 and 42, thus allowing them freedom to rotate. In the preferred embodiment of the invention, the mechanical driving means to move the table is comprised of a $y$-axis pinion 32 and $x$-axis pinion 42, each is comprised of cylindrically shaped and constructed of suitable metal and having a gear teeth cut along their length, such as teeth 35 on the $y$-axis pinion and teeth 45 on the $x$-axis pinion, such teeth meshing with coupling means whereby the table is caused to move in response to rotation of the pinions. Such coupling means in the preferred embodiment are the gear teeth of racks 11, 12, 13, and 14 appended to and extending downward from the sides of the table surface. Each pinion is machined in its center portion to effect small diameter shafts 33 and 43, thus enabling the pinions to freely cross. Further, each pinion is machined on its ends to form support pins 31, 34, 41, and 44 which mount in bushings 51, 52, 53, and 54 in general support body 50, thus enabling each pinion to be rotated by its respective handle 30 or 40. Although handles 30 and 40 are shown as means to rotate the pinions 32 and 42, it is to be understood that such means as motors controlled by a computer or other similar means may be used equally well without departing from the spirit and scope of the invention, and if motors are used, it is to be emphasized that they would not be mounted on the table assembly, but would be external to the movable table surface.

Figure 2:
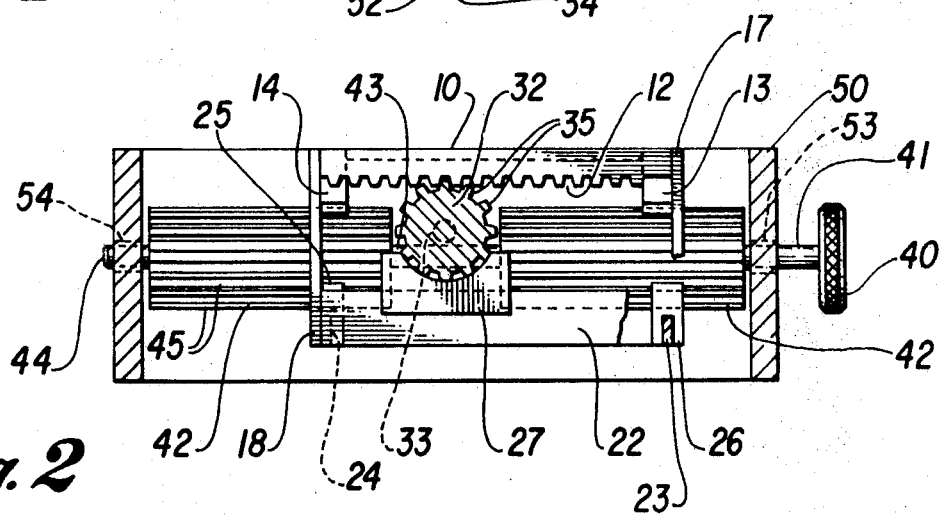
FIG. 2 is a side view of FIG. 1, taken at 2—2, and partially cut away showing the relationship of the table, racks and pinions.

In order for the pinions to freely cross, the pinions may be of different radii so that the center line of the machined center shafts will pass in different planes. Also, the pinions may be mounted one lower than the other with two of the parallel racks extended to engage the lower positioned pinion. The latter construction is shown in the drawing of FIG. 2. In FIG. 2, it can be seen that the center shaft 43 of the $x$-axis pinion 42 crosses below the center shaft 33 of the $y$-axis pinion. This requires, of course, that bushings 51 and 52 be positioned at a lower position in support body 50 than bushings 53 and 54.

An alternative method of construction for the pinion crossover is shown in FIG. 4. Therein, a crossover frame 60 is provided with bushings mounted therein to receive the respective milled center shafts of the $x$- and $y$ pinions. One of the pinions, the $y$-axis pinion, is cut to effect two portions: a drive portion 32, and an idler portion 32'. Since movements of the table are guided by the gear teeth of the pinion extending in the direction of movement, the idler pinion 32' acts as a support means and guide for the table when it is moved in the $y$ direction, and acts merely as a "follower" gear and support means when the table is moved in the $x$ direction.

The table assembly, as shown in FIGS. 1–3, comprises a table surface 10 of general parallelogram shape having racks 11, 12, 13, and 14, appended to its sides, the gear teeth of racks 11 and 12 engaging the gears of the y-axis pinion 32 and the gear teeth of racks 13 and 14 engaging the gears of the x-axis pinion 42. Although the table may be made of any material, it is preferable that it be constructed of a lightweight material such as aluminum or the like to keep the inertial mass at a minimum. The racks may be mounted, as shown in the drawings, so that their upper smooth surfaces 10 are flush with the table surface, thus enlarging the working area. Racks 13 and 14 are of height larger than racks 11 and 12 in order to engage the gears of pinion 42 which is, as above explained, mounted lower than y-axis pinion 32.

To maintain contact between the racks and pinions, should the table be subjected to other forces, such as torsion forces, restraining means, such as members 21, 22, 23, and 24 and guides 25, 26, 27 and 28, are provided. Members 21, 22, 23, and 24 are rigidly held in position by supports 15, 16, 17, and 18, which may, for example, be bolted or screwed to the racks of the table and the members 21, 22, 23 and 24. Each of guides 25, 26, 27, and 28 is respectively grooved along the bottom to allow them to travel freely along members 24, 23, 22, and 21, respectively, and are cut in a semicircular shape to accommodate the pinion intermediate the rack thereover and member on which the guide is mounted. It will be seen that any forces upon the table, other than the driving forces of the pinions, will be resisted by the guides 25, 26, 27, and 28 and members 21, 22, 23, and 24 regardless of the position of the table with respect to the pinions since the guides, being free to slide on the members 21, 22, 23, and 24, remain stationary with respect to the pinions. Again, it is preferable to utilize a lightweight material for these parts, since, being carried with the table surface, they add to the inertial mass of the table.

In many operations for which a movable table has application, the forces applied are only in the center portion of the table apparatus, ideally over the point where the pinions are shown to cross in the figures. Hence, in applications wherein the table surface is not subjected to forces which tend to cause the table to fall from the pinions, the restraining means can be omitted entirely. In addition, it should be emphasized that the restraining means shown is but one of many means which can be used to hold the table firmly in position while allowing freedom of movement only in the desired working plane.

The table, as above described, can be accurately positioned by rotating either the x-axis pinion 42 or the y-axis pinion 32. For example, if the y-axis pinion 32 is rotated clockwise (looking in the direction of the positive y-axis shown in FIG. 1), the table will be moved along the positive x-axis, the teeth of racks 13 and 14 sliding along and being guided by the gears of the x-axis pinion 42; or, conversely, the table will be moved in the negative x-axis direction by rotating the y-axis pinion 32 counterclockwise. Similarly, the table will be moved along the positive y-axis by rotating the x-axis pinion 42 counterclockwise (looking in the direction of the positive x-axis); or it will be moved along the negative y-axis by rotating the x-axis pinion 42 clockwise. The table will be moved along any angular direction from the x-y axes by rotating the pinions 32 and 42 simultaneously.

Although the x-y table has been described with the x and y axis pinions disposed on the underside of the table, it can be appreciated that one or both of the pinions may be disposed on the top side of the table. Of course, in such configuration, the pinions engaging the pinions over the table will have to also be mounted on the top side of the table, and any work pieces must be of a size so as not to interfere with the pinions over the table; for example, a table of such configuration could be used in connection with items of dimensions such as those of printed circuit boards or the like.

Although the invention has been described with a certain degree of particularity, it is understood that the present disclosure has been made only by way of example and that numerous changes in the details of construction and the combination and arrangement of parts may be resorted to without departing from the spirit and the scope of the invention.

What is claimed is:
1. A movable table comprising:
at least two racks containing gear teeth, each mounted respectively on nonparallel sides of one surface of said table,
two pinions, each having gear teeth engaging the teeth of one of said at least two racks, and
means for supporting said pinions in a freely rotating position, each pinion being perpendicular to the other and in continuous contact with at least one of said racks, whereby when either of said pinions is caused to rotate, the table surface moves in a direction along the longitudinal axis of the other pinion, the gear teeth of said other pinion functioning as guide slots for the table.

2. The movable table of claim 1 wherein said pinions are mounted in displaced planes so as not to contact each other and said racks are of different height to effect contact therewith.

3. The movable table of claim 1 wherein said pinions are of different radii so as not to contact each other and said racks are of different height to effect contact therewith.

4. The movable table of claim 1 wherein said pinions are machined in their interior portions to effect a small diameter shaft in each and mounted in displaced planes so as not to contact each other, and said racks are of different height to effect contact therewith.

5. A movable table comprising:
a table surface of general parallelogram shape,
at least two non-parallel racks mounted on the underside of said table surface,
a first pinion extending beyond the extremities of said table surface, and engaging the teeth of one of said at least two racks,
a second pinion having a shaft cut at one end thereof, extending from near said first pinion to beyond an end of said table surface, and engaging the teeth of one of said at least two racks different from the rack the teeth of which are engaged by said first pinion,
support means extending, on the side of said first pinion opposite said second pinion, from near said first pinion to beyond an edge of said table surface,
receiving means providing a base for said support means and said second pinion, and allowing at least said second pinion to rotate,
whereby when said first pinion is caused to rotate, said table surface responds in movement along the gears of said second pinion while deriving support from said support means, and when said second pinion is caused to rotate, said table surface responds in movement along said first pinion while deriving support from said support means.

6. A movable table comprising:
a table surface of general parallelogram shape,
at least two non-parallel racks mounted on said table surface, at least one of said racks being on the upper side of said surface,
a first pinion extending beyond the extremities of said table surface, and engaging the teeth of one of said at least two racks,
a second pinion having a shaft cut at one end thereof, extending from near said first pinion to beyond an end of said table surface, and engaging the teeth of one of said at least two racks different from the rack the teeth of which are engaged by said first pinion,
support means extending, on the side of said first pinion opposite said second pinion, from near said first pinion to beyond an edge of said table surface, receiving means providing a base for said support means and said second pinion, and allowing at least said second pinion to rotate, whereby when said first pinion is caused to rotate, said table surface responds in movement along the gears of said second pinion while deriving support from said support means, and when said second pinion is caused to rotate, said table surface responds in movement along said first pinion while deriving support from said support means.

7. The movable table of claim 5 including means to restrain said surface to move only in response to forces tending to move said surface in a desired working plane.

8. The movable table of claim 6 including means to restrain said surface to move in response to forces tending to move said surface in a desired working plane.

9. The movable table according to claim 1 wherein at least one of said racks is mounted on the upper side of said surface.

References Cited

UNITED STATES PATENTS

| | | | |
|---|---|---|---|
| 992,066 | 5/1911 | Roberts | 108—87 X |
| 1,241,246 | 9/1917 | Payne | 269—58 X |
| 1,307,808 | 6/1919 | Clark | 108—87 |
| 2,187,423 | 1/1940 | Hyland | 108—87 X |
| 2,741,520 | 4/1956 | Mares | 108—50 |
| 2,994,526 | 8/1961 | Clawson | 269—60 X |
| 2,995,826 | 8/1961 | Brault | 77—5 X |

JAMES T. McCALL, Primary Examiner

U.S. Cl. X.R.

108—102